United States Patent

Hein

[11] Patent Number: 5,879,556
[45] Date of Patent: Mar. 9, 1999

[54] METHOD OF RECOVERING EXTRACTANT

[75] Inventor: Hans C. Hein, Santiago, Chile

[73] Assignee: Henkel Corporation, Plymouth Meeting

[21] Appl. No.: 378,150

[22] Filed: Jan. 25, 1995

[51] Int. Cl.$^6$ .................................................. B01D 11/00
[52] U.S. Cl. ........................ 210/634; 210/638; 210/804
[58] Field of Search ............................... 423/24; 210/634, 210/803, 804, 805, 511, 638, 639; 422/256, 258, 259

[56] References Cited

U.S. PATENT DOCUMENTS

| | | | |
|---|---|---|---|
| 3,428,449 | 2/1969 | Swanson | 75/117 |
| 3,592,775 | 7/1971 | Swanson | 252/182 |
| 4,020,105 | 4/1977 | Ackerly et al. | 260/566 A |
| 4,020,106 | 4/1977 | Ackerly et al. | 260/566 A |
| 4,029,704 | 6/1977 | Anderson | 260/566 A |
| 4,085,146 | 4/1978 | Beswick | 260/600 R |
| 4,290,882 | 9/1981 | Dempsey | 210/634 |
| 4,334,999 | 6/1982 | Cornwell | 210/638 |
| 4,455,234 | 6/1984 | Markham et al. | 210/638 X |
| 4,507,268 | 3/1985 | Kordosky et al. | 423/24 |
| 4,544,532 | 10/1985 | Kordosky et al. | 423/24 |
| 4,582,689 | 4/1986 | Kordosky | 423/24 |
| 4,753,732 | 6/1988 | Davis et al. | 210/634 |
| 4,874,534 | 10/1989 | Sorensen et al. | 210/803 |
| 4,957,714 | 9/1990 | Olafson et al. | 423/24 |
| 5,202,028 | 4/1993 | Kermer et al. | 210/634 |
| 5,281,336 | 1/1994 | Dalton et al. | 210/634 |
| 5,618,432 | 4/1997 | Rewitzer et al. | 210/634 |

FOREIGN PATENT DOCUMENTS 1322532  7/1973  United Kingdom .

OTHER PUBLICATIONS

Solvent Extraction, Principals and Applications to Process Metallurgy, Part II, pp. 642–650, Ritcey & Ashbrook.

*Primary Examiner*—Joseph W. Drodge
*Attorney, Agent, or Firm*—Ernest G. Szoke; Wayne C. Jaeschke; Patrick J. Span

[57] ABSTRACT

A method for the recovery of extractant from the aqueous effluent continuously exiting from a solvent extraction circuit, in which the effluent is contacted with the same water-immiscible diluent being used in the circuit as solvent for the extractant, such that the extractant transfers from the aqueous effluent phase to the diluent phase. The diluent phase, now enriched in extractant, is separated from the aqueous effluent, now depleted in extractant. The separated diluent phase can then be recontacted with effluent or may be combined with the organic phase of the solvent extraction circuit.

21 Claims, 1 Drawing Sheet

METHOD OF RECOVERING EXTRACTANT

BACKGROUND OF THE INVENTION

1. Field of the Invention

This invention relates to a method for the recovery of extractant from the aqueous effluents of a continuously operating solvent extraction circuit.

2. Description of Related Art

The operation of a solvent extraction circuit can be exemplified by the following description of a large scale circuit using mixer-settlers for processing of copper. The starting material is an aqueous feed solution obtained by leaching copper ions from ore. The aqueous feed solution is mixed in tanks with an organic solvent comprising an extractant which is dissolved in an organic diluent, e.g., a kerosene. The extractant selectively forms a metal-extractant complex with the copper ions in preference to ions of other metals. The step of forming the complex is called the extraction or loading stage of the solvent extraction process.

The outlet of the mixer continuously feeds to a large settling tank, where the organic solvent (organic phase), now containing the copper-extractant complex in solution, is separated from the depleted aqueous solution (aqueous phase). This part of the process is called phase separation. Usually, the process of extraction is repeated through a total of two or more mixer-settler stages, in order to more completely extract the desired metal.

Where two or more mixer-settler stages are employed for extraction, countercurrent flow of the aqueous feed solution and the organic phase or extractant solution is employed. In a typical 3-stage extraction system, for example, the aqueous feed solution will flow through an initial mixer-settler stage ("$E_1$"), subsequently through a second stage ("$E_2$"), and then through a final mixer-settler stage ("$E_3$"). The organic phase will, in turn, initially contact the aqueous feed solution in $E_3$, encounter a subsequent contact in $E_2$ and a final contact in $E_1$. As a result, by the time the aqueous feed solution reaches mixer-settler stage $E_3$, substantial amounts of copper will have been extracted from it and it will be contacting an organic phase low in copper. Correlatively, when the organic phase reaches mixer-settler $E_1$, much of the extractant will be in the form of copper-extractant complex and the organic phase will be contacting the aqueous feed solution when it is in a condition wherein little, if any, of the dissolved copper has been extracted.

After extraction, the depleted aqueous solution (extraction effluent or raffinate) may be passed through a means for recovery of readily separated organic droplets, and is then either discharged or recirculated for further leaching. Any organic phase droplets which remain associated with the effluent exit from the system along with the aqueous phase and are lost. Even in systems where the effluent is recirculated, such as in leaching of ore to regenerate a feed solution, any organic phase associated with the effluent tends to be adsorbed irreversibly on the ore and does not return to the circuit with regenerated feed.

The loaded organic phase from extraction containing the dissolved copper-extractant complex is fed to another set of mixer-settlers, where it is mixed with an aqueous strip solution of relatively concentrated sulfuric acid. The highly acid strip solution breaks apart the copper-extractant complex and permits the purified and concentrated copper to pass to the strip aqueous phase. As in the extraction process described above, the mixture is fed to another settler tank for phase separation. This process of breaking apart the copper-extractant complex is called the stripping stage, and the stripping operation is optionally repeated in a counter-current manner through a total of two or more mixer-settler stages to more completely strip the copper from the organic phase.

From the stripping settler tank, the regenerated stripped organic phase is recycled to the extraction mixers to begin extraction again, and the strip aqueous phase is customarily fed to an electrowinning tank-house, where the copper metal values are deposited on plates by a process of electrodeposition. After electrowinning the copper values from aqueous strip solution, the solution is recycled to the stripping mixers to begin stripping again. As with the extraction effluent, any organic which is associated with the strip aqueous leaving the circuit tends to be lost. Entrained organic tends to accumulate in the electrowinning cells, where the properties of the organic can be degraded. For practical purposes, this constitutes lost organic. Furthermore, the extractant tends to accumulate at the liquid surface of the electrowinning cells, causing deterioration of the quality of the deposited copper.

A similar loss of organic from a solvent extraction circuit can take place where any aqueous phase leaves the circuit after contacting the organic phase. For purposes of this invention, such an aqueous phase exiting a solvent extraction circuit is referred to as an effluent, whether it be an extraction effluent, a strip effluent, a wash effluent, or any other exiting aqueous phase.

For the most part, the organic phase associated with the effluent is not dissolved in the aqueous phase, but consists of entrained organic, that is, suspended droplets of insoluble organic phase which did not coalesce with the bulk organic phase during phase separation. Organic losses can be exacerbated by several means: organic phase may be adsorbed on undissolved solids in the aqueous phase, often referred to as crud, and be discharged with the effluent; non-ideal flow patterns in a settler may lead to locally rapid liquid velocities, sweeping out organic droplets that otherwise would have settled and coalesced; or disturbances that perturb the organic/aqueous interface may result in organic phase being carried out with the aqueous phase.

An analytical method has been used for determining the level of entrained organic in aqueous effluent from a copper solvent extraction circuit, in which a known volume of effluent is first shaken in a separatory funnel with another known volume of a water-immiscible solvent in which the entrained organic is known to be soluble. The separated solvent phase, now containing the entrained organic, is then contacted with an excess of aqueous copper solution to load the contained extractant to its maximum loading capacity. The copper level of the loaded solvent phase can then be determined to very low levels by atomic adsorption spectroscopy, and the level of extractant can be back-calculated on the basis of known stoichiometry of copper to extractant.

For most circuits, a large portion of the cost of organic phase lost is due to the contained extractant, since the extractant is often much more expensive than the diluent. For example, in copper solvent extraction the extractant may cost 25–35 times as much per pound as the diluent. Such a circuit organic phase formulated with 20% extractant in diluent can thus cost as much as 10 times as diluent alone. In other circuits the cost of reagent relative to diluent can be much higher.

Diluent often tends to be lost from a circuit more rapidly than extractant because of evaporation. Because diluents tend to be non-polar materials of relatively low viscosity, they have higher vapor pressures than extractants, and evaporate more rapidly. Thus makeup of organic in a circuit will typically require proportionately more diluent than extractant.

*Solvent Extraction, Principals and Applications to Process Metallurgy*, Part II, pp. 642–650, by Ritcey & Ashbrook, cites several techniques which have been applied in the solvent extraction industry to recover entrained organic phase. Flotation involves dispersing air into the aqueous phase to generate small bubbles which adsorb the organic droplets and convey them to the surface where they coalesce. A variant of this technique dissolves air into the aqueous phase under pressure, and then suddenly releases the pressure; air bubbles nucleate on the organic droplets and carry them to the surface. However, flotation techniques have limited organic recovery capacity and require significant energy input to disperse or dissolve the air. Alternatively, aqueous effluent may be passed through a coalescence vessel containing a solid with hydrophilic surfaces. Organic droplets tend to coalesce and accumulate on the solid surface; these can then be collected by backwashing and returned to the circuit. Coalescing vessels, however, can be ineffective if the aqueous is not free of solids. Carbon adsorption can be effective in removing organic droplets by adsorption, but the capacity of adsorption is relatively low, and regeneration can be expensive. Centrifuges can remove organic entrainment effectively, but are very expensive to operate and maintain. Cyclones can also be effective, but the high liquid velocity required means increased pumping costs, and the shear forces involved in pumping can actually cause finer dispersion of the entrained organic droplets.

Thus, it would be desirable to have a method for recovering the extractant lost in solvent extraction effluents in order to reduce costs. It would be especially desirable to have a method which would recover both extractant in entrained organic as well as any extractant dissolved in the aqueous phase, and which would operate simply with a minimum energy requirement.

DESCRIPTION OF THE INVENTION

Figure 1:
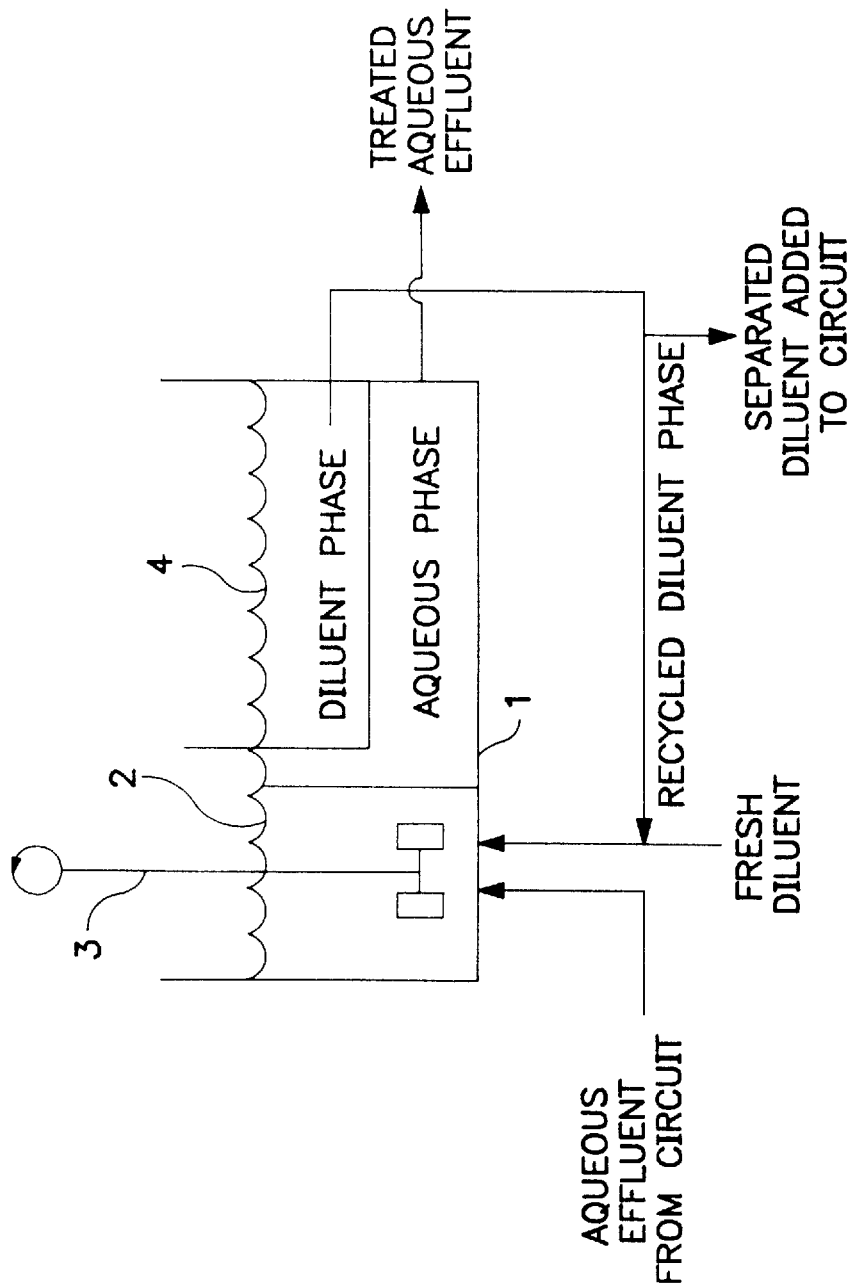
FIG. 1 is a diagrammatic representation of a specific embodiment of the method of the invention.

In this description, except where explicitly otherwise indicated, all numbers describing amounts of ingredients or reaction conditions are to be understood as modified by the word "about" in describing the broadest scope of the invention. Practice of the invention within the exact numerical limits is, however, generally preferred.

This invention provides a method for recovering extractant from aqueous effluent continuously exiting from a solvent extraction circuit, in which the effluent is contacted with the same diluent being used in the circuit, such that the extractant transfers from the aqueous effluent phase to the diluent phase. The aqueous effluent, now depleted in extractant, is then separated from the diluent phase, now enriched in extractant. The separated diluent phase may then be re-contacted with effluent to recover further extractant, or it may be combined with the organic phase of the solvent extraction circuit.

The extractant in this invention may be any organic molecule or combination of molecules which is preferentially soluble in a water-immiscible diluent, and which exhibits an ability to complex or associate with a solute initially present in an aqueous solution. Examples of extractants include, but are not limited to, orthophenolic oximes, primary, secondary and tertiary amines, quaternary ammonium compounds, substituted guanidines, phosphine oxides, esters and partial esters of phosphoric, phosphonic and phosphinic acid, aliphatic carboxylic acids and esters, sulfonic acids, and esters of pyridine carboxylic acids. Preferred extractants for use in the invention include those containing one or more hydroxyl aryl oxime extractants of the hydroxyl aryl, aldoxime or ketone oxime type.

Hydroxy aryl ketoxime extractants which may be employed in reagents for practice of the invention are those of Formulas I and II below:

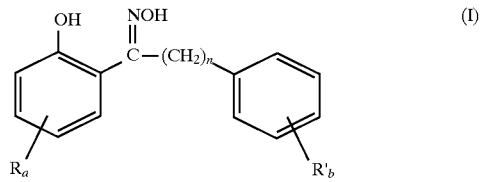

in which R and R' may be individually alike or different and are saturated aliphatic groups of 1–25 carbon atoms, ethylenically unsaturated aliphatic groups of 3–25 carbon atoms or —OR" where R" is a saturated or ethylenically unsaturated aliphatic group as defined; n is 0 or 1; and a and b are each 0, 1, 2, 3, 4, with the proviso that both are not 0 and the total number of carbon atoms in $R_a$ and $R'_b$ is from 3 to 25,

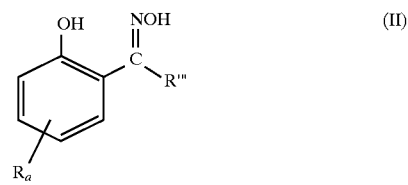

in which R and a are as defined with respect to formula I and R''' is a saturated aliphatic group of 1–25 carbon atoms or an ethylenically unsaturated aliphatic group of 3–25 carbon atoms, with the proviso that the total number of carbon atoms in $R_a$ and R''' is from 3 to 25.

Preferred compounds of Formula I are those wherein a is 1, b is 0, R is a straight or branched chain alkyl group having from 7 to 12 carbon atoms, and wherein R is attached in a position para to the hydroxyl group. Among these, the more preferred are those wherein R is a mixture of isomers. Preferred compounds of Formula II are those wherein R''' is methyl and R and a are as designated as being preferred for compounds of Formula I.

Compounds of Formula I wherein n has a value of 0 (i.e., hydroxybenzophenone oxime compounds) may suitably be prepared according to the methods disclosed in Swanson U.S. Pat. Nos. 3,592,775 and 3,428,449. By reason of ease and economy of synthesis from available starting materials, ready solubility in organic diluents commonly employed in solvent extraction and desirable properties of complexes of the compounds with copper, preferred benzophenone oxime compounds of Formula I include those having a single alkyl ring substituent having from 7 to 12 carbon atoms in a position para to the hydroxy group, which alkyl substituent is a mixture of isomers. Examples of such compounds are 2-hydroxy-5-nonylbenzophenone oxime and 2-hydroxy-5-dodecylbenzophenone oxime which are obtained as mixtures of alkyl isomeric forms when commercial nonylphenol and dodecyl phenol are respectively employed in their synthesis.

Compounds of Formula I wherein n has a value of 1 (i.e., hydroxyphenyl benzyl ketone oxime compounds) may suitably be prepared according to the methods described in Anderson, U.S. Pat. No. 4,029,704. Preferred phenylbenzyl ketone oximes, like the above-noted benzophenone oximes, are those having an isomeric mixture of 7 to 12 carbon alkyl groups as a single substituent on the ring para to the hydroxyl group. These preferred compounds are exemplified by the compound, 2-hydroxy-5-nonylphenyl benzyl ketone oxime, as manufactured from a commercial nonylphenol comprising a mixture of nonyl isomeric forms.

Compounds of Formula II (i.e., hydroxyphenyl alkyl ketone oxime compounds) may suitably be prepared according to the procedures disclosed in U.K. Pat. No. 1,322,532. As noted with regard to benzophenone oxime and phenylbenzyl ketone oxime compounds of Formula I, preferred phenylalkyl ketone oxime compounds of Formula II are those having an isomeric mixture of 7 to 12 carbon alkyl groups as a single substituent on the ring para to the hydroxyl group. Also preferred are compounds wherein the R''' alkyl group is methyl. Consequently, illustrative of preferred phenyl alkyl ketone oxime compounds is 2-hydroxy-5-nonylphenyl methyl ketone oxime manufactured through use of commercial nonylphenol.

Hydroxy aryl aldoxime extractants which may be employed in reagents for practice of the invention are those of Formula III

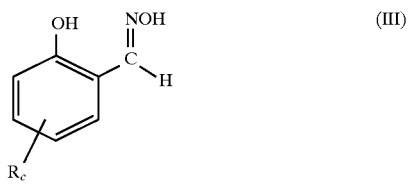

in which R is as defined above with respect to Formulas I and II, c has a value of 1, 2, 3 or 4, and the total number of carbon atoms in Rc is from 3 to 25. Preferred compounds of Formula III are those wherein c is 1, R is a straight or branched chain alkyl group having from 7 to 12 carbon atoms, and wherein R is attached in a position para to the hydroxyl group. Among these, the more preferred are those wherein R is a mixture of isomers.

Compounds of Formula III (i.e., hydroxybenzaldoxime compounds, sometimes referred to as "salicylaldoximes") may suitably be prepared according to the methods described in Ackerley et al., U.S. Pat. Nos. 4,020,105 or 4,020,106 or by oximation of aldehydes prepared according to Beswick, U.S. Pat. No. 4,085,146. Again, preferred compounds are those having an isomeric mixture of isomeric 7 to 12 carbon alkyl groups as a single substituent para to the hydroxyl group. Mixed alkyl isomeric forms of 2-hydroxy-5-heptylbenzaldoxime, 2-hydroxy-5-octyl 2-hydroxy-5-nonylbenzaldoxime and 2-hydroxy-5-dodecylbenzaldoxime are thus preferred.

Extractants may include a single extractant chemical as illustrated above or may comprise mixtures of different aldoxime or ketoxime extractants of the type illustrated in U.S. Pat. Nos. 4,507,268, 4,544,532 and 4,582,689. In addition to the extractant, the organic phase may also include modifiers to enhance the performance properties of the system. Examples of modifiers include but are not limited to nonylphenol, isotridecyl alcohol, 2,2,4-trimethylpentane-1,3-diisobutyrate, and 5,8-diethyl-7-hydroxy-6-dodecanone oxime.

The extractant in this invention is dissolved in a diluent to provide the organic phase used in the solvent extraction circuit. The diluent is a water-immiscible liquid solvent capable of dissolving the extractant and the associated complex of extractant and extracted solute. The choice of diluent will depend on a number of factors, including the nature of the contacting equipment being used, the characteristics of the extractant and the solute to be extracted, the value and desired properties of the final product of extraction, and the like. Examples of diluents include toluene, xylene, ethylene dichloride, and kerosenes. Kerosenes are preferred diluents, several types of which are available. Examples of commercially available kerosenes include Chevron Ion Exchange Solvent (available from Standard Oil of California—flash point 195° F.), Escaid 100 and 110 (available from Exxon-Europe—flash point 180° F.), Exxon Aromatic 150 (an aromatic kerosene available from Exxon-USA—flash point 160° F.), Phillips SX 1 and 7 (available from Phillips Petroleum—flash point 160° F.), and Conoco 170 Exempt Solvent (available from Conoco—flash point 170° F.).

Of the typical differences between extractants and diluents, two are of especial importance in this invention. First, diluents tend to have higher vapor pressure and evaporate much more rapidly than do extractants. This leads to an uneven rate of loss, so that proportionately more diluent than extractant needs to be added to a circuit to keep its organic phase at a constant composition. Second, extractants tend to be considerably more expensive than diluents, so that recovery of extractant is much more cost effective than recovery of diluent. This invention utilizes these two differences, using the less expensive diluent that would have to be added to the circuit anyway to recover the more expensive extractant from the aqueous effluent.

This invention does not eliminate organic entrainment, because there is typically some organic entrainment remaining in the effluent after the contacting with diluent has been accomplished. However, the composition of the organic entrained after contact with the diluent is substantially lower in extractant level than is the organic entrained directly from the circuit. In effect, this invention replaces organic entrainment containing expensive extractant with organic entrainment containing predominately inexpensive diluent. Thus the greater the cost difference between extractant and diluent, the greater the savings attainable from this invention.

As previously indicated, the separated diluent phase from this invention may be added to the solvent extraction circuit, or it may be recycled by re-contacting one or more times with more effluent to build up the concentration of recovered extractant to a higher level.

Normally, all the diluent that would be added to the solvent extraction circuit as make up diluent to replace diluent lost by entrainment or evaporation, or a substantial portion thereof, will first be used in the process of this invention to recover extractant from effluent and then be added to the circuit. Thus the amount of diluent used to contact the effluent is essentially the same as or is less than an amount of diluent required for replacing diluent lost from said continuous solvent extraction circuit.

Where the separated diluent is recycled, the volume ratio of diluent to effluent may acceptably range between a low of $1/30,000$ and a high of $5/1$, preferably between $1/100$ and $2/1$, and more preferably between $1/20$ and $1/1$. Overall, the number of recycles of diluent phase may acceptably range between zero, in the case where the separated diluent after contacting effluent is added directly to the solvent extraction circuit, and about 30,000. Preferably, the number of recycles of diluent phase will be between about 500 and about 15,000, and more preferably between about 1000 and about 10,000. The portion of the separated diluent which is added to the solvent extraction circuit may acceptably range from about 0.003% to 50%, preferably from about 0.007% to 0.2%, and more preferably from about 0.01% to 0.1%. Correspondingly, the portion of separated diluent which is recycled may acceptably range from about 50% to 99.997%, preferably from about 99.8% to 99.993%, and more preferably from about 99.9% to 99.99%.

The type of equipment used to contact aqueous effluent with diluent can vary. The primary consideration is that the interfacial surface area generated between aqueous effluent and diluent during the contacting step be large enough and maintained long enough for the droplets of entrained organic to coalesce with diluent phase before the organic-aqueous mixture separates again. Fortunately, this coalescence process is rapid, so that high energy input for mixing of phases is not necessary. Useful contacting means include mixers mechanically agitated with turbines, typically overflowing into a gravity settler. This mixer-settler combination is preferably operated with a direct recycle of separated diluent phase from the settler back to the mixer, effectively giving multiple contacts of the diluent phase with the aqueous effluent phase.

FIG. 1 is a diagrammatic representation of a continuous mixer-settler recycling system with organic recycle. The mixer-settler unit 1 is comprised of a mixer compartment 2 equipped with an agitator 3, and a settler compartment 4 for coalescence of the mixed phases. Aqueous effluent from the solvent extraction circuit and a combination of fresh and recycled diluent are continuously added to mixer 2 where agitator 3 disperses the phases to produce an emulsion. During the time the phases are in the mixer, the organic entrained in the aqueous effluent phase dissolves in the diluent phase. The emulsion of the two mixed phases overflows the mixer 2 into the settler 4, where sufficient residence time is provided to allow separation into aqueous and diluent phases. Separated aqueous phase continuously exits the settler as treated aqueous effluent. Separated diluent phase continuously exits the settler and is split, a portion of which is recycled to the mixer 2 for contact with a further quantity of aqueous effluent, and a portion of which is removed from the recovery system and added to the solvent extraction circuit from which the aqueous effluent came. The rate of removal of diluent phase is essentially the same as the rate of addition of fresh diluent. The volume ratio of recycled diluent phase to removed diluent phase is related to the average number of recycles experienced by the diluent phase. For example, a ratio of 100 to 1 would result in a average number of recycles of about 100. Thus to attain 2000 recycles of the diluent phase, the volume of fresh diluent added, which is essentially the same as the volume of diluent phase removed, would be about 0.05% of the volume recycled. To attain a single recycle of the diluent phase, the volume of fresh diluent added, and that of the diluent phase removed, would be equal to the volume recycled. Thus the number of recycles can be controlled by setting the volume ratio of recycled diluent to removed diluent phase. The number of recycles can acceptably range between one and 20,000, preferably between 500 and 15,000, and more preferably between 1000 and 10,000.

Another preferred contacting means is the injection of diluent phase into a pipe carrying the aqueous effluent phase, preferably upstream of an in-line mixer. A convenient point for this injection of diluent is the aqueous weir box of the last mixer-settler before the effluent leaves the solvent extraction circuit. Aqueous typically overflows continuously from the settler into a weir box, and then flows out the bottom of the weir box via a pipe. Continuous addition of diluent at this point allows for mixing as the two phases flow into the pipe. Although not required, the in-line mixer uses the velocity of the liquid past stationary mixing vanes in the pipe to impart a mixing action, thus dispersing one phase the other. The pipe or transfer line then delivers the two-phase mixture to a quiescent zone where the phases can separate. The quiescent zone can be a settler or, in the case of large scale mining operations, it may be a "raffinate pond" where the effluent is accumulated prior to reuse in leaching. The separated diluent phase is skimmed from the surface. In any case, the separated diluent phase is recycled for further contact with the effluent phase or is added to the solvent extraction circuit.

In another embodiment of this invention, the diluent phase may be used to contact more than one effluent stream from the same solvent extraction circuit. Typically, a circuit will produce at least an extraction effluent and a stripping effluent. The process normally results in concentration the extracted material, such as copper, from the aqueous feed solution into the stripping solution, so that the volume of stripping solution is substantially smaller than the volume of the aqueous feed solution. It is preferable to contact the diluent first with stripping effluent to recover entrained organic phase, then contact that separated diluent with extraction effluent before adding the final separated diluent to the solvent extraction circuit. Thus the volume ratio of diluent to aqueous will be higher during the contact with stripping effluent, resulting in a greater dilution of recovered extractant into the diluent and a lower concentration of extractant remaining in the treated stripping effluent. In the case of copper electrowinning, this gives the added benefit of minimizing "organic burn" on the cathodes, and allows production of a higher quality copper deposit. The separated diluent from treating stripping effluent is then contacted with the extraction effluent, where the volume ratio of diluent to aqueous will be lower, but where substantial recovery of entrained organic phase is still possible. Then the separated diluent from treatment of the extraction effluent is added to the solvent extraction circuit. A preferred option in this embodiment is, in the treatment of the stripping effluent, to recycle a major portion of the separated diluent to contact further stripping effluent, and to transfer a minor portion of the separated diluent to treatment of the extraction effluent. Similarly, it is preferred that, in the treatment of the extraction effluent, a major portion of that separated diluent is recycled to contact further extraction effluent, and a minor portion of that separated diluent is added to the solvent extraction circuit.

The process of this invention may also be used in conjunction with other means for recovering organic entrainment from effluents. Devices such as after-settlers, adsorption columns or flotation columns may be used recover a portion of the entrained organic, and the effluent exiting such a device may then be treated by the process of this invention. In this way, the concentration of extractant accumulated in the separated diluent phase will be lower, and the loss of extractant in treated effluent will be reduced.

To further illustrate the various objects and advantages of the present invention, the following example is provided. It is understood that its purpose is entirely illustrative and in no way intended to limit the scope of the invention.

EXAMPLE 1

A laboratory solvent extraction circuit was assembled with 2 stages of extraction, 1 stage of stripping and 1 stage of organic recovery. The aqueous feed solution was a copper leach solution containing 2.8 g/l Cu and 0.3 g/l Fe at pH 1.80. The stripping solution was a copper spent electrolyte containing 30 g/l Cu and 193 g/l $H_2SO_4$. The organic phase for the extraction and stripping stages was 8.3 (v/v)% LIX®984N (a mixed oxime extractant available from Henkel Corporation) in Conosol® 170 exempt solvent (a kerosene available from Conoco). The aqueous feed and organic phases were each pumped at a rate of 45 ml/min, while the stripping solution was pumped at a rate of 7.8 ml/min. An aqueous recycle was used in the stripping stage to maintain an organic to aqueous (O/A) ratio of 1 to 1 in the mixer. The aqueous raffinate stream from the second extraction stage was advanced to the organic recovery stage. The organic phase in the organic recovery stage was 350 ml of Conosol® 170 exempt solvent, which was recycled by pumping from the settler back to the mixer at a rate of 45 ml/min. Thus the organic recovery mixer was operated at an O/A of ⅟₁. The concentration of LIX®984N in the organic recovery stage organic phase was monitored by withdrawing 5 ml of organic from the settler and adding 5 ml of fresh Conosol® 170 exempt solvent to the mixer. The sample of organic phase from the organic recovery stage was then maximum loaded by successive contacts with aqueous solution of pH 1.9 containing a large excess of copper, and the copper concentration of the loaded organic determined by atomic absorption spectroscopy. The average ppm of circuit organic recovered in the organic recovery stage during each time increment was calculated from the copper concentration based on a comparison of the original circuit organic concentration and the increase in extractant concentration in the recovery stage. Results of the experiment are shown below.

| Total Hours of Circuit Operation | Total Liters $E_2$ Raffinate | Organic Max Load ppm Cu | (v/v) % LIX ®984N | ppm Entrainment Recovered |
| --- | --- | --- | --- | --- |
| 3.25 | 8.78 | 14.5 | .0276 | 133 |
| 8.08 | 21.82 | 23.8 | .0453 | 88 |
| 13.08 | 35.32 | 30.9 | .0589 | 70 |
| 17.75 | 47.93 | 36.0 | .0686 | 60 |
| 23.00 | 62.10 | 45.3 | .0863 | 59 |

The data show that the organic recovery stage effectively accumulates entrained organic, the level of which continues to rise over extended operation. According to the present invention, when the extractant concentration in the separated diluent phase reaches a desired level, additional diluent would be added to the mixer and a similar volume of separated diluent would be removed from the settler and added to the solvent extraction circuit.

What is claimed is:

1. In a process comprising operating a continuous solvent extraction circuit wherein an aqueous metal containing solution is contacted in an extraction stage with an organic phase of a water-immiscible organic diluent having dissolved therein an extractant for said metal, and the aqueous phase is separated from the organic phase providing an aqueous effluent containing entrained organic phase, the improvement wherein the extractant in the entrained organic phase comprised of extractant and water-immiscible organic diluent is recovered from the aqueous effluent exiting the continuous solvent extraction circuit, by the method comprising the steps of (a) contacting the effluent with the same diluent employed in the extraction stage of the circuit for a time sufficient to allow the extractant in the entrained organic containing extractant to dissolve in the diluent; and (b) separating the effluent from the diluent, now containing an increased level of extractant; and wherein the extractant is selected from the group consisting of (i) ortho-phenolic oximes, (ii) primary, secondary and tertiary amines, (iii) quaternary ammonium compounds, (iv) substituted guanidines, (v) phosphine oxides, (vi) esters of phosphoric, phosphonic and phosphinic acids, (vii) aliphatic carboxylic acids and esters, (viii) sulfonic acids, and (ix) esters of pyridine carboxylic esters; and said diluent is a water-immiscible liquid solvent capable of dissolving the extractant and the associated complex of extractant and extracted solute, selected from the group consisting of toluene, xylene, ethylene dichloride and kerosene.

2. In a process comprising operating a continuous solvent extraction circuit wherein an aqueous solution containing metal values is contacted in an extraction stage with an organic phase comprised of a water-immiscible organic diluent having dissolved therein an extractant for said metal values and the aqueous solution from which the metal values has been extracted is (i) separated from the organic phase, providing an aqueous extraction effluent containing entrained organic phase from which the entrained organic phase, if not recovered, will be lost from the circuit and (ii) the organic phase now containing the extracted metal values after the extraction step is contacted with an aqueous stripping solution to remove the metal values from the organic phase thereby providing an aqueous stripping effluent containing further entrained organic phase, the improvement comprising recovering the extractant in the entrained organic phase from (x) an aqueous effluent exiting the continuous extraction circuit and containing entrained organic phase by a method comprising: (a) contacting the exiting aqueous effluent (x) with (y) additional diluent, which is the same diluent employed in the extraction stage, for a time sufficient to allow the extractant in the entrained organic phase to dissolve in the diluent (y); and (b) separating the aqueous effluent (x) from diluent (y) now enriched in extractant.

3. The method of claim 2 wherein at least a portion of the separated diluent is recycled by contacting with a further portion of effluent in step (a).

4. The method of claim 3 wherein the separated diluent is recycled an average of from one to about 30,000 times.

5. The method of claim 2 wherein at least a portion of the separated diluent is added to the solvent extraction circuit.

6. The method of claim 5 wherein the portion of the separated diluent which is added to the solvent extraction circuit is more than 0.003% but not more than 50%.

7. The method of claim 2 wherein the diluent is contacted with the effluent by in-line mixing.

8. The method of claim 2 wherein the diluent is contacted with the effluent in a mixer-settler.

9. The method of claim 8 wherein the mixer-settler is operated with at least partial recycle of separated diluent.

10. The method of claim 9 wherein the portion of separated diluent which is recycled is greater than 50% and less than 99.997%.

11. The method of claim 2 wherein said diluent is used to contact two or more aqueous effluents from the same solvent extraction circuit.

12. The method of claim 11 wherein said diluent is first contacted with a stripping effluent and subsequently is contacted with an extraction effluent.

13. The method of claim 2 wherein the extractant comprises a phenolic oxime.

14. The method of claim 13 wherein the oxime is selected from the group consisting of a 2-hydroxy-5-alkylbenzophenone oxime in which the alkyl group contains about 7 to about 12 carbon atoms; a 2-hydroxy-5-alkylbenzaldoxime in which the alkyl group contains from about 7 to about 12 carbon atoms; a 2-hydroxy-5- alkylphenyl methyl ketone oxime in which the alkyl group contains from about 7 to about 12 carbon atoms; 2-hydroxy-5-nonylphenyl benzyl ketone oxime; and mixtures thereof.

15. The method of claim 14 wherein the benzophenone oxime is 2-hydroxy-5-nonylbenzophenone oxime.

16. The method of claim 14 wherein the benzaldoxime is 2-hydroxy-5-nonylbenzaldoxime.

17. The method of claim 14 wherein the benzaldoxime is 2-hydroxy-5-dodecylbenzaldoxime.

18. The method of claim 14 wherein the alkylphenyl methyl ketone oxime is 2-hydroxy-5-nonylphenyl methyl ketone oxime.

19. The method of claim 2 wherein the extractant is an hydroxy aryl oxime comprising (a) one or more hydroxy aryl ketone oxime compounds of Formula I or II,

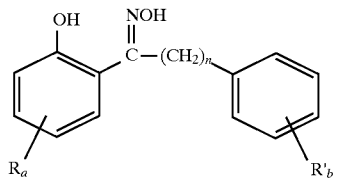
(I)

in which R and R' may be individually alike or different and are saturated aliphatic groups of 1–25 carbon atoms, ethylenically unsaturated aliphatic groups of 3–25 carbon atoms, or —OR" where R" is a saturated or ethylenically unsaturated aliphatic group as defined; n is 0 or 1; and a and b are each 0, 1, 2, 3, 4, with the proviso that both are not 0 and the total number of carbon atoms in $R_a$ and $R'_b$ is from 3 to 25,

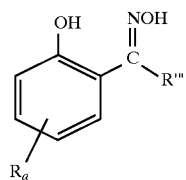
(II)

in which R and a are as defined with respect to formula I and R''' is a saturated aliphatic group of 1–25 carbon atoms or an ethylenically unsaturated aliphatic group of 3–25 carbon atoms, with the proviso that the total number of carbon atoms in Ra and R''' is from 3 to 25; and/or (b) one or more hydroxy aryl aldoxime compounds of Formula III,

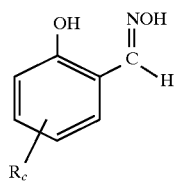
(III)

in which R is as defined above with respect to Formulas I and II, c has a value of 1, 2, 3, or 4, and the total number of carbon atoms in $R_c$ is from 3 to 25.

20. The method of claim 2 wherein the diluent is kerosene.

21. The method of claim 2 wherein the amount of diluent used to contact the effluent in step (a) is essentially the same as or is less than an amount of diluent required for replacing diluent lost from said continuous solvent extraction circuit.

* * * * *